Figure 1:
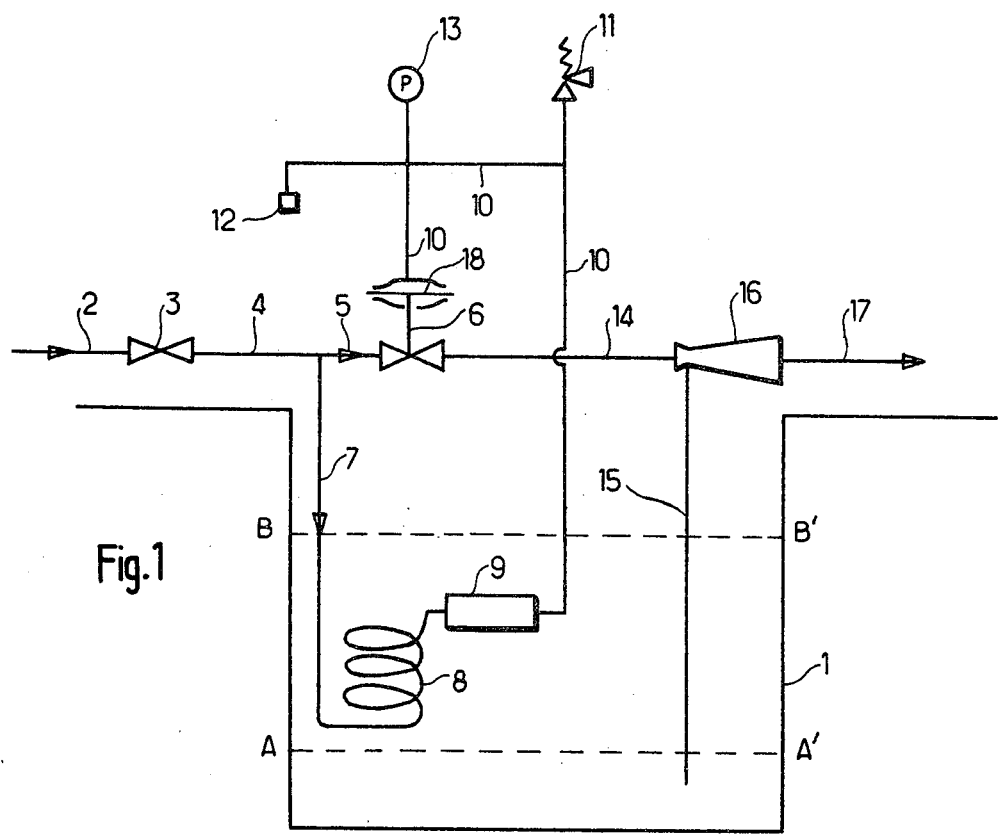

United States Patent [19]

Le Carrou

[11] 4,440,188

[45] Apr. 3, 1984

[54] PROCESS AND DEVICES FOR CONTROLLING THE LEVEL OF A LIQUID

[76] Inventor: Joseph Le Carrou, 7, rue de la Victoire, 76290 Montivilliers, France

[21] Appl. No.: 298,643

[22] Filed: Sep. 2, 1981

Related U.S. Application Data

[63] Continuation of Ser. No. 138,732, Jul. 27, 1979, abandoned.

[51] Int. Cl.³ ............................................. F17D 1/12
[52] U.S. Cl. ........................................................ 137/2
[58] Field of Search ................. 137/2, 101.25, 101.27, 137/154, 386, 187, 393, 395, 396; 417/182.5; 73/295

[56] References Cited

U.S. PATENT DOCUMENTS

| | | | |
|---|---|---|---|
| 346,878 | 8/1886 | White | 417/182.5 |
| 346,967 | 8/1886 | White | 417/182.5 |
| 970,411 | 9/1910 | Woodall | 417/182.5 |
| 1,376,102 | 4/1921 | Knapp | 137/393 |
| 1,645,639 | 10/1927 | Anderson | 417/182.5 |
| 2,931,224 | 4/1960 | Anderson | 73/295 |
| 3,215,089 | 8/1963 | Hoffman | 417/182.5 |
| 3,877,242 | 4/1975 | Creager | 137/101.25 |

Primary Examiner—Martin P. Schwadron
Assistant Examiner—James R. Shay
Attorney, Agent, or Firm—Scully, Scott, Murphy & Presser

[57] ABSTRACT

The present invention relates to a process and devices for controlling the level of a liquid contained in an enclosure.

The enclosure contains a condenser in which is introduced a gaseous fluid. When the condenser bathes in the liquid, the fluid condenses and it is the pressure of the condensed fluid which actuates the member controlling the level of the liquid.

25 Claims, 4 Drawing Figures

PROCESS AND DEVICES FOR CONTROLLING THE LEVEL OF A LIQUID

This is a continuation, of application Ser. No. 138,732, filed July 27, 1979 now abandoned.

The present invention relates to a process and devices for controlling the level of a liquid contained in an enclosure.

It is current in industry to have to control the level of a liquid contained in an enclosure so as to avoid the presence of excess liquid in the enclosure, which might in particular cause overflowing or so as to maintain at a certain height the interface between two liquids of different densities.

This is the case particularly for sumps for collecting rainwater in oil product storage depots for example or for the holds of ships.

This is also the case for enclosures supplied permanently or not with a liquid whose flow is controlled by a valve.

Another possible case is that of regulating the level of an interface between two liquids of different densities and substantially immiscible (for example aqueous phase - organic phase, such as a more or less viscous oil product).

Controlling the level of the liquid in such cases requires more or less complicated devices. For example, there may be mentioned a device comprising a float mounted on an articulation and actuating a discharge system when the liquid, and so the float, reaches a specific level in the enclosure. This system is not very reliable for the float is a fragile element, likely to be pierced and the articulation sometimes jams.

The applicant has perfected a particularly simple and reliable device for controlling the level of a liquid contained in an enclosure.

The aim of the present invention is then to control the level of a liquid contained in an enclosure.

The present invention provides then a process for controlling the level of a liquid contained in an enclosure, said process consisting in continuously supplying a condenser placed in said enclosure with a fluid brought to a gaseous state under pressure p and at a temperature $t_1$, greater than the temperature $t_2$ of said liquid, said fluid being condensible at said pressure p and at said temperature $t_2$, said process comprising the following steps:

(a) the condensation of said fluid in said condenser when the level of the liquid in the enclosure is such that said condenser plunges in the liquid and said fluid is then at temperature $t_2$, (b) the discharge of said condensed fluid outside the condenser, said discharge causing, under the effect of the pressure of the condensed fluid, the liquid contained in the enclosure to be drawn off outside said enclosure and/or the supply of liquid into the enclosure to be stopped, (c) stopping the discharge of said fluid outside said condenser, causing the drawing off of said liquid outside the enclosure to be stopped and/or the supply to the enclosure to be started up again, when the level of the liquid contained in the enclosure is such that the condenser is situated outside the liquid and so at a temperature greater than $t_2$ such that said gaseous fluid no longer condenses therein, (d) repeating steps (a) and (b) when the condenser again plunges in the liquid.

The invention also provides devices for implementing the process of the invention.

The process of the invention consists then in condensing in a condenser when this latter is plunged in the liquid whose level it is desired to control, a fluid brought to the gaseous state and at a temperature $t_1$, said fluid continuously supplying said condenser. This condensation must of course be possible, that is to say that at temperature $t_2$ of the liquid, and so of the condenser, the gaseous fluid being at a supply pressure p, is able to condense. The form of the condenser may be very variable; it may for example be a simple tube or a coiled tube.

When the fluid is condensed in the condenser, said condensed fluid is discharged automatically outside said condenser. This discharge is effected by means of a member, for example a thermostatic drain cock, which only lets the substance through when this latter is in a condensed state. A thermostatic drain cock contains an element which, according as to whether it is in contact with the gaseous fluid, at temperature $t_1$, or the condensed fluid at temperature $t_2$, closes or opens the drain cock. This element may for example be a bimetallic strip or a bellows element containing alcohol.

In the process of the invention, it is the pressure of the condensed fluid which causes the liquid contained in the enclosure to be drawn off and/or the supplying of the enclosure with liquid to be stopped.

This may in particular be obtained by causing the pressure of this fluid to start up, by means of a servomotor, a pump adapted to draw off the liquid outside the enclosure and/or to control a valve situated in the supply line for the enclosure.

The pressure of the condensed fluid may be also exerted on an automatic membrane valve. This latter is placed in a bypass of the gaseous fluid supply. It opens when the pressure of the condensed fluid is exerted thereon. The gaseous fluid is then led to an ejector, and by disposing between the valve and the ejector a line plunging into the liquid, this latter is drawn off by being carried along by the gaseous fluid.

The liquid and the fluid used in the process of the invention may be different or similar. It may be in both cases for example water. The process and devices of the invention may have numerous applications: control and regulation of the level of liquids in balloon flasks, ships' holds, decanters etc. . .

The four figures accompanying the present description illustrate in a non limiting way the present invention.

Referring to FIG. 1, the enclosure in which it is desired to control the liquid level is formed by a sump 1 containing water.

The device of the invention is formed by a steam supply line 2 possibly equipped with a valve 3. The steam is at a temperature of about 230° C., and at a pressure of 6.5 bars absolute.

Valve 3 is connected by lines 4 and 5 to an automatic valve 6 and by lines 4 and 7 to a condenser 8. The condenser 8 is shown in the figure in the form of a coil, but it may have any other form and be in particular formed only by a part of line 7. Condenser 8 is connected to a thermostatic drain cock 9. This latter is connected by line 10 to an automatic valve 6. Line 10 is equipped with a safety valve 11, a calibrated discharge orifice 12 and, possibly, a pressure gauge 13. Valve 6 is connected by line 14 to an ejector 16 whose output is formed by line 17. A line 15 plunging into the water contained in the sump is connected to line 14.

The device operates in the following way:

1. The level of the water in the sump is low (line AA')

The automatic valve 6 is closed. The steam arrives through lines 2, 4, 7 (valve 3 being open) into condensor 8. Since this latter is above the level of the water contained in the sump, the steam heats the condenser and does not condense therein, or very little. The small amount of water liable to be condensed therein is discharged through drain cock 9 into line 10. This small amount of water is however not sufficient to establish a pressure on the membrane 18 of valve 6, and is discharged through the calibrated orifice 12.

2. The level of the water in the sump is high (line BB')

With automatic valve 6 still closed, the steam arrives through lines 2, 4, 7 (valve 3 open) into condenser 8. Since this latter is below the level of the water contained in the sump, and so maintained at ambient temperature, the steam condenses therein. The water condensed is discharged through drain cock 9 into line 10. The amount of water condensed is such that the calibrated orifice is sufficient to discharge it and the pressure exerted on membrane 18 of valve 6 causes this latter to open. The steam then passes into line 14 towards ejector 16 and carries along the water contained in the sump. The water is discharged through line 17.

The level of the water lowers in the sump when condenser 8 comes back above level AA', the steam no longer condenses therein and valve 6 closes.

The cycle begins again when the level of the water rises in the sump.

The device of the invention enables then the level of the water in the sump to be controlled.

Figure 2:
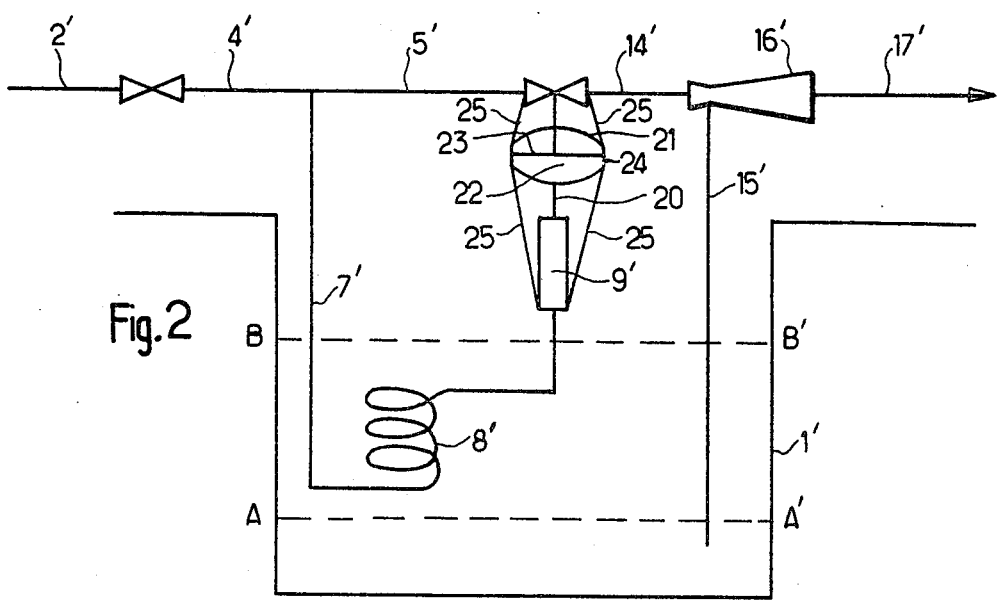

Referring to FIG. 2 which illustrates another device in accordance with the invention, the elements identical to those in FIG. 1 are shown with the same reference numbers to which the sign ' has been added. Only the parts different from those of FIG. 1 will be described. In this device, drain cock 9' is connected directly by line 20 to an automatic valve 21. In this automatic valve, in part 22 of the valve situated in front of the membrane 23, there is provided a calibrated discharge orifice 24.

Through this orifice the small amount of water may be discharged which is likely to condense in condenser 8' when this latter is not plunging in the water of the sump. This leak is advantageous for it enables the presence of hot liquid to be maintained in line 20, which was not the case with line 10 of FIG. 1. Freezing up in winter may thus be avoided.

Furthermore, the device shown in FIG. 2 is particularly compact and the automatic valve 21 and the drain cock 9' may form part of the same unit shown by lines 25.

The operation of this device is moreover in all respects similar to that of device 1.

Figure 3:
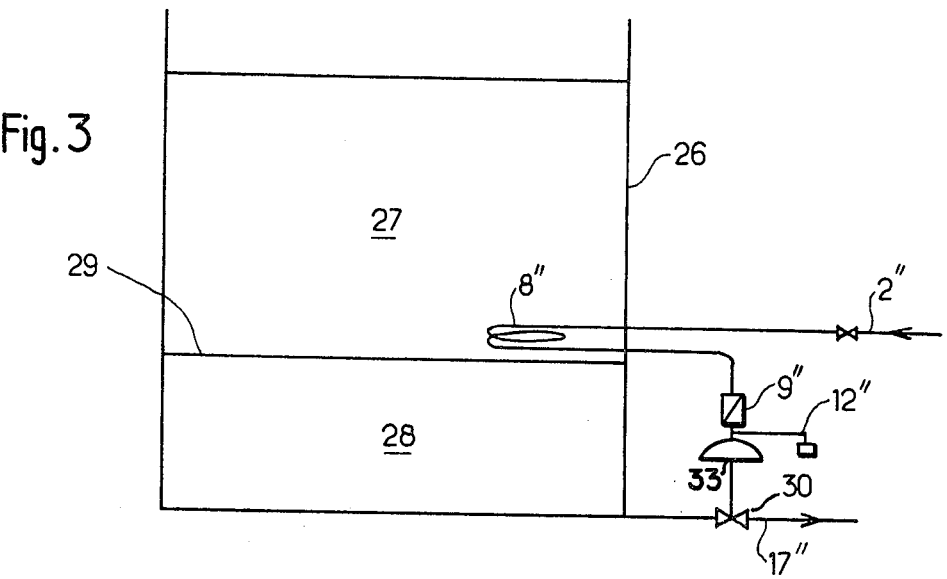

FIG. 3 shows another possible use of the process of the invention. The elements in this figure identical to those of FIG. 1 are shown with the same reference numbers to which the sign " has been added. Enclosure 26 is here filled with two substantially immiscible liquid phases 27 and 28, between which exists an interface 29. These phases may for example be formed by water on the one hand and at least one organic liquid on the other. Oil products may for example form this organic phase. The heat transfer coefficient at the level of condensation member 8" varies according as to whether it is bathed by the aqueous phase or by the organic phase. Thus, if condenser 8" is in the organic phase (as shown in the figure), a certain amount of steam is condensed, passes through drain cock 9" and is discharged through a calibrated orifice 12"; there is no pressure on the membrane of servomotor 33 and the automatic drain valve 30 is closed. If, on the other hand, the level of interface 29 rises and condenser 8" bathes in the aqueous phase, the amount of steam condensed is greater, the pressure rises on the membrane of the servomotor and causes the drain valve to open, thus causing the level of the interface to drop until we have again the preceding situation.

Figure 4:
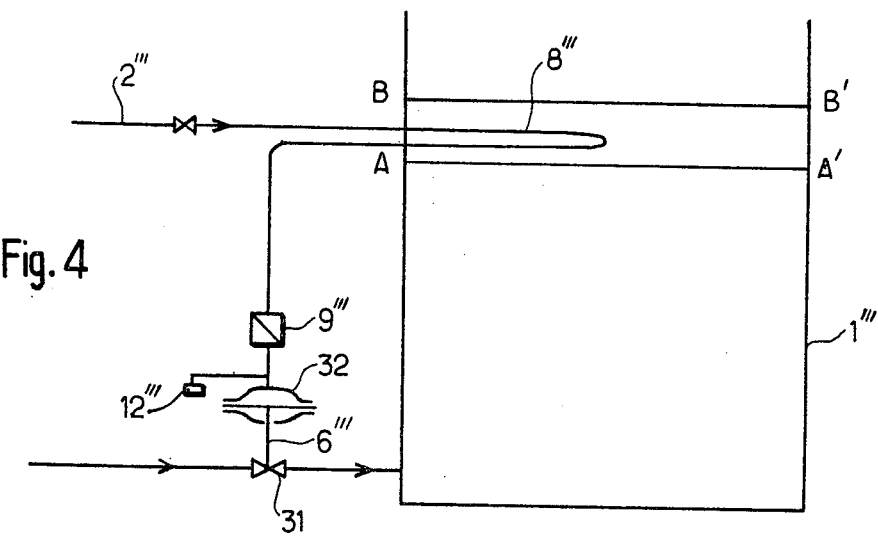

FIG. 4 illustrates the use of the process of the invention for limiting the level in an enclosure by action on the liquid supply valve of said enclosure. In this figure, the elements identical to those of FIG. 1 are shown with the same reference numbers to which the sign '" has been added. When the level in the enclosure 1'" is at AA', condenser 8'" is out of the liquid, there is little or no condensation of the fluid passing into the condenser; the pressure on the membrane of the servomotor 32 is low and valve 31 controlling the supply to the enclosure is open. If, on the other hand, the level rises to BB', the condenser is in the liquid; the fluid condenses, drain cock 9'" opens, the flow of condensates causes the pressure to rise on the membrane of the servomotor and causes the valve to close, thus stopping the supply to enclosure 1'".

I claim:

1. A process for controlling the level of a liquid at a temperature $t_2$ contained in an enclosure, comprising (a) continuously supplying a condenser placed in said enclosure with a fluid which is in a gaseous state under pressure p and at a temperature $t_1$, greater than the temperature $t_2$ of said liquid, which will condense to a liquid at said pressure p and at said temperature $t_2$, such that the fluid in said condenser condenses when the level of the liquid in the enclosure immerses the condenser in the liquid to cause said fluid to approach the temperature $t_2$, (b) discharging said condensed fluid outside the condenser, (c) sensing said discharge, (d) drawing off the level of the liquid in said enclosure in response to said sensed discharge, (e) sensing when the fluid in said condenser does not condense because the liquid level in the enclosure does not immerse the condenser in the liquid, and (f) increasing the level in said enclosure responsive to said second step of sensing.

2. A process as claimed in claim 1, characterized in that the liquid and the fluid are identical and are formed by water.

3. A process as claimed in claim 1 which further includes the step of discharging said condensed fluid through an orifice of predetermined diameter.

4. A process as claimed in claim 1 which further includes the step of discharging said condensed fluid through an adjustable orifice having a predetermined range of diameters.

5. A process as claimed in claim 1 which further includes the step of discharging said fluid through an orifice formed in a thermostatic drain cock.

6. A process as claimed in claim 1 which further includes the step of drawing off the level of liquid in said container through a conduit extending into said container by pressurizing a venturi ejector with said fluid in its gaseous state.

7. A process for controlling a liquid level in a container, said process comprising:

(a) continuously supplying a condenser in a container with a gaseous fluid;
(b) discharging said fluid from said condenser through an orifice of preselected diameter;
(c) pressurizing a pressure responsive valve motor with the remaining fluid after a portion thereof has been discharged through said orifice;
(d) controlling the liquid level in said container in response to the pressure developed by the remaining fluid supplied to said pressure responsive valve motor.

8. A process for controlling a liquid level as claimed in claim 6 which further includes regulating an interface level between a first and a second liquid in a container by selecting a gaseous fluid, an orifice diameter and a heat transfer co-efficient that will condense more fluid than may be discharged through said orifice when said condenser is immersed in said first of said liquids and condense less fluid than may be discharged when said condenser is immersed in said second liquid.

9. A process for controlling a liquid level as claimed in claim 6 which further includes the step of drawing off said liquid to regulate the liquid level.

10. A process for controlling a liquid level as claimed in claim 6 which further includes the step of supplying additional liquid to said container to control said liquid level.

11. A process for controlling a liquid level as claimed in claim 6 which further includes the step of stopping the flow of liquid to said container to control said liquid level.

12. A process for controlling a liquid level as claimed in claim 6 which further includes the step of discharging said fluid through an orifice formed in a thermostatic drain cock.

13. A process for controlling a liquid level as claimed in claim 6 wherein said gaseous fluid is steam, and the liquid level to be controlled is a water level in said container.

14. A process for controlling a liquid level as claimed in claim 7 wherein said gaseous fluid is steam, said first of said liquids is water, and said second of said liquids is oil.

15. A process for controlling a liquid level as claimed in claim 6 which further includes the step of discharging said fluid through an adjustable orifice having a predetermined range of diameters.

16. A process for controlling a liquid level as claimed in claim 7 which further includes the step of withdrawing said first liquid through a conduit extending into said container by pressurizing a venturi ejector with said gaseous fluid when said pressure responsive valve motor is actuated.

17. A means for regulating a liquid level in a container, said means comprising:
(a) a condenser means mounted within said container at a predetermined level,
(b) means for supplying a gaseous fluid to said condenser means,
(c) discharge means for discharging said fluid through an orifice of preselected diameter,
(d) valve means to control the liquid level in said container,
(e) means responsive to the rate of fluid discharge through said orifice to open and close said valve means.

18. A means for regulating a liquid level in a container as claimed in claim 17 wherein said discharge means further includes an adjustable orifice having a predetermined range of diameters.

19. A means for regulating a liquid in a container as claimed in claim 17 wherein said gaseous fluid comprises steam, and said liquid to be regulated comprises water.

20. A means for regulating a liquid level as claimed in claim 17 wherein said liquid level is a liquid level interface between a first and a second liquid stored in a container, said means mounting said condenser in said container at the desired interface level.

21. A means for regulating a liquid level as claimed in claim 20 which further includes a venturi ejector for withdrawing a portion of said first liquid through a conduit extending into said container, said venturi ejector being pressurized as said valve means is opened.

22. A means for regulating a liquid level in a container as claimed in claim 17 wherein said valve means opens a discharge line from said container to allow liquid to flow therefrom when said valve means is opened.

23. A means for regulating a liquid level in a container as claimed in claim 17 which further comprises venturi means for drawing off said liquid when said valve means is opened.

24. A means for regulating a liquid level in a container as claimed in claim 16 wherein said means further includes a conduit to add fluid to said container when said valve means is opened.

25. A means for regulating a liquid level in a container as claimed in claim 17 wherein said valve means interrupts the flow of liquid to said container when said valve means is closed.

* * * * *

UNITED STATES PATENT AND TRADEMARK OFFICE
CERTIFICATE OF CORRECTION

PATENT NO. : 4,440,188
DATED : April 3, 1984
INVENTOR(S) : Joseph Le Carrou

It is certified that error appears in the above-identified patent and that said Letters Patent are hereby corrected as shown below:

Column 1, line 2 "filed July 27, 1979 now abandoned." should read --filed April 9, 1980 now abandoned.--

Signed and Sealed this

Twenty-fifth Day of September 1984

[SEAL]

Attest:

GERALD J. MOSSINGHOFF

Attesting Officer    Commissioner of Patents and Trademarks